(12) United States Patent
Maltsev et al.

(10) Patent No.: US 7,489,621 B2
(45) Date of Patent: Feb. 10, 2009

(54) ADAPTIVE PUNCTURING TECHNIQUE FOR MULTICARRIER SYSTEMS

(76) Inventors: Alexander A Maltsev, Verhne-Pecherskaya Str., 1-7, Nizhny Novgorod, 603132 (RU); Ali S. Sadri, 11835 Carmel Mountain Rd., Suite 1304-360, San Diego, CA (US) 92128; Alexei V. Davydov, Lenin ave. 28/11-40, Nizhny Novgorod, 603132 (RU)

( * ) Notice: Subject to any disclaimer, the term of this patent is extended or adjusted under 35 U.S.C. 154(b) by 980 days.

(21) Appl. No.: 10/749,853

(22) Filed: Dec. 30, 2003

(65) Prior Publication Data

US 2005/0157638 A1 Jul. 21, 2005

(51) Int. Cl.
*H04J 9/00* (2006.01)
*H04L 5/04* (2006.01)

(52) U.S. Cl. .................. 370/205; 370/201; 370/202; 370/203; 370/204; 370/206; 370/207; 370/208; 370/209; 370/210; 370/211; 370/212; 370/213; 375/260; 375/262; 375/265; 375/341; 714/786; 714/792; 714/795

(58) Field of Classification Search .................. None
See application file for complete search history.

(56) References Cited

U.S. PATENT DOCUMENTS

| | | | |
|---|---|---|---|
| 6,701,129 B1 | 3/2004 | Hashem et al. | |
| 2002/0102940 A1 * | 8/2002 | Bohnke et al. | 455/23 |
| 2003/0043732 A1 | 3/2003 | Walton et al. | |
| 2003/0043928 A1 | 3/2003 | Ling et al. | |
| 2003/0236071 A1 | 12/2003 | Ito | |

OTHER PUBLICATIONS

"Supplement to IEEE Standard for Information Technology-Telecommunications and Information Exchange Between Systems—Local and Metropolitan Area Networks-Specific Requirements-Part II: Wireless LAN Medium Access Control (MAC) and Physical Layer (PHY) Specifications: High-Speed Physical Layer in the 5 GHZ Band", IEEE Std 802.11a-1999, Sep. 16, 1999, pp. 1-44, USA.

B. Bangerter et al., "Wireless Technologies: High-Throughput Wireless LAN Air Interface", Intel Technology Journal, Aug. 19, 2003, pp. 47-57, vol. 7, No. 3.

PCT International Search Report, International Application No. PCT/US2004/043648, Completion Date: May 12, 2005, Mailing Date: May 23, 2005, pp. 1-5.

Thomas Keller and Lajos Hanzo, Adaptive Modulation Techniques for Duplex OFDM Tranmission, IEEE Transaction on Veh. Tec. vol. 49, No. 5 Sep. 2000, pp. 1893-1999.

Y.Yasuda et, al., High Rate Punctured Convolutional Codes for Soft Decision Viterbi Decoding, IEEE Trans. on Commun.,Com-32 pp. 315-319, Mar. 1994.

(Continued)

*Primary Examiner*—Chi H Pham
*Assistant Examiner*—Raj K Jain
(74) *Attorney, Agent, or Firm*—Kacvinsky LLC (57) ABSTRACT

Various embodiments are described for adaptive puncturing techniques involving an adaptive bit loading block to select a modulation scheme and a puncturing pattern for each of a plurality of subcarriers or subcarrier bands based on subcarrier channel state information.

18 Claims, 3 Drawing Sheets

200

OTHER PUBLICATIONS

Hayes et, al. The Instition of Electrical and Electronics Engineers, Inc., Wireless LAN Medium Access Control (MAC) and Physical Layer (PHY) Specifications: High-Speed Physical Layer in the 5 GHZ Band, IEEE Std 802.11a-1999, pp. 1-90.

Bangerter, B. et al., "Wireless Technologies: High-Throughput wireless LAN Air Interface", Intel Technology Journal, 7(3), (Aug. 19, 2003),47-57, 50,LHC- 52.

"Supplement to IEEEE Standard for information Technology . . . Local and metropolitan area networks—Specific requirements—Part II: Wireless LAN Medium Access Control (MAC) and Physical Layer (PHY) specifications: High-speed Physical Layer in the 5 GHZ Band", IEEE STD 802.11A-1999, (Sep. 16, 1999),16, 17, 18.

Lai, Sai Kit, et al., "Adaptive Tellis Coded MQAM and Power Optimization for OFDM Transmission", Vehicular Technology Conference, 1999 IEEE 49th, vol. 1, Jul. 1999, pp. 290-294.

* cited by examiner

ADAPTIVE PUNCTURING TECHNIQUE FOR MULTICARRIER SYSTEMS

BACKGROUND INFORMATION

Multicarrier communications may be described as a communications technique in which multiple carriers or subcarriers are used to communicate information. As an example of multicarrier communications, Orthogonal Frequency Division Multiplexing (OFDM) may be described as a communications technique that divides a communications channel into a number of spaced frequency bands. In OFDM, a subcarrier carrying a portion of the user information may be transmitted in each band. In OFDM, each subcarrier may be orthogonal, differentiating OFDM from the commonly used frequency division multiplexing (FDM). An OFDM symbol may include, for example, a symbol transmitted simultaneously on each of the OFDM subcarriers during the OFDM symbol period. These individual symbols may be referred to as subcarrier symbols.

Some communication systems may include features that may adapt to some types of changing conditions. For example, some systems allow a data transmission rate to be adjusted based upon a detected transmission condition. However, some types of adaptive systems can be complex or expensive. A need exists for an improved adaptive system

DETAILED DESCRIPTION

In the detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Some portions (if the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radio-telephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example. A data block may be any unit of data or information bits.

Figure 1:
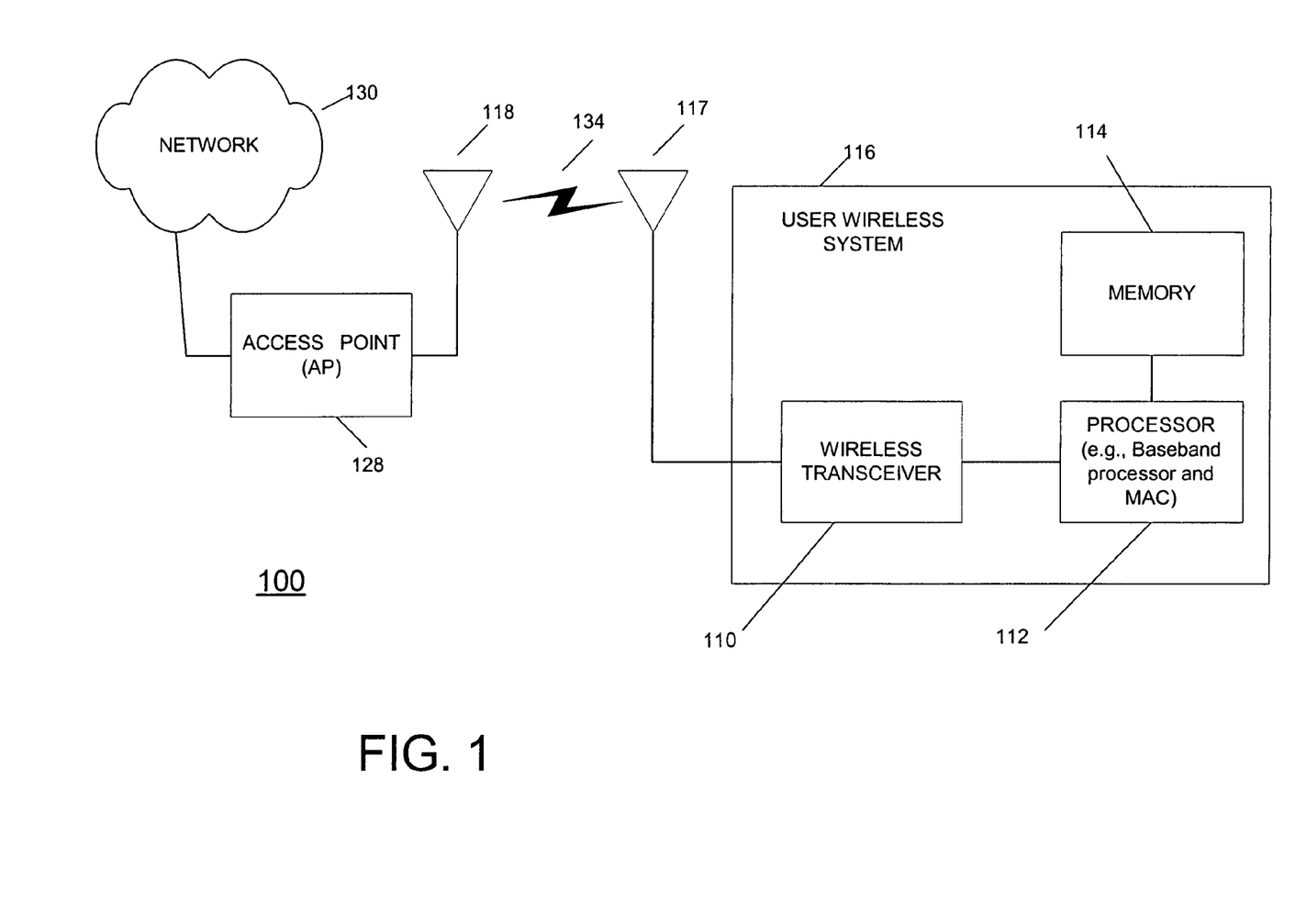
FIG. 1 is a diagram illustrating an example of a wireless communication system in accordance with one embodiment of the invention.

Referring to the Figures in which like numerals indicate like elements, FIG. 1 is a diagram illustrating an example of a wireless communication system in accordance with one embodiment of the invention. In the communications system 100 shown in FIG. 1, a user wireless system 116 may include a wireless transceiver 110 coupled to an antenna 117 and to a processor 112. Processor 112 in one embodiment may comprise a single processor, or alternatively may comprise a baseband processor and an applications processor, although the scope of the invention is not limited in this respect. According to one embodiment, processor 112 may include a baseband processor and Medium Access Control (MAC).

Processor 112 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as processor 112, or alternatively some portion or all of memory 114 may be disposed on an integrated circuit or other medium, for example a hard disk drive, that is external to the integrated circuit of processor 112, although the scope of the invention is not limited in this respect. According to one embodiment, software may be provided in memory 114 to be executed by processor 112 to allow wireless system 116-to perform a variety of tasks, some of which may be described herein.

Wireless system 116 may communicate with an access point (AP) 128 (or other wireless system) via wireless communication link 134, where access point 128 may include at least one antenna 118. Antennas 117 and 118 may each be, for example, a directional antenna or an omni directional antenna, although the invention is not limited thereto. Although not shown in FIG. 1, AP 128 may, for example, include a structure that is similar to wireless system 116, including a wireless transceiver, a processor, a memory, and software provided in memory to allow AP 128 to perform a variety of functions. In an example embodiment, wireless system 116 and AP 128 may be considered to be stations in a wireless communication system, such as a WLAN system.

Access point 128 may be coupled to network 130 so that wireless system 116 may communicate with network 130, including devices coupled to network 130, by communicating with access point 128 via wireless communication link 134. Network 130 may include a public network such as a telephone network or the Internet, or alternatively network 130 may include a private network such as an intranet, or a combination of a public and a private network, although the scope of the invention is not limited in this respect.

Communication between wireless system 116 and access point 128 may be implemented via a wireless local area network (WLAN), for example a network which may be compliant with an Institute of Electrical and Electronics Engineers (IEEE) standard such as IEEE 802.11a, IEEE 802.11b, IEEE 802.11g, IEEE 802.11n, IEEE 802.15, IEEE 802.16 and so on, although the scope of the invention is not limited in this respect.

In another embodiment, communication between wireless system 116 and access point 128 may be implemented via a cellular communication network compliant with a 3GPP standard, although the scope of the invention is not limited in this respect.

One or more aspects of the invention may be applied to single carrier systems where information may be transmitted over a single carrier. Alternatively, one or more aspects of the invention may be applied to multicarrier systems, such as an OFDM (Orthogonal Frequency Division Multiplexing) system for example, where information may be transmitted over multiple carriers or subcarriers, although the invention is not limited in this regard.

Figure 2:
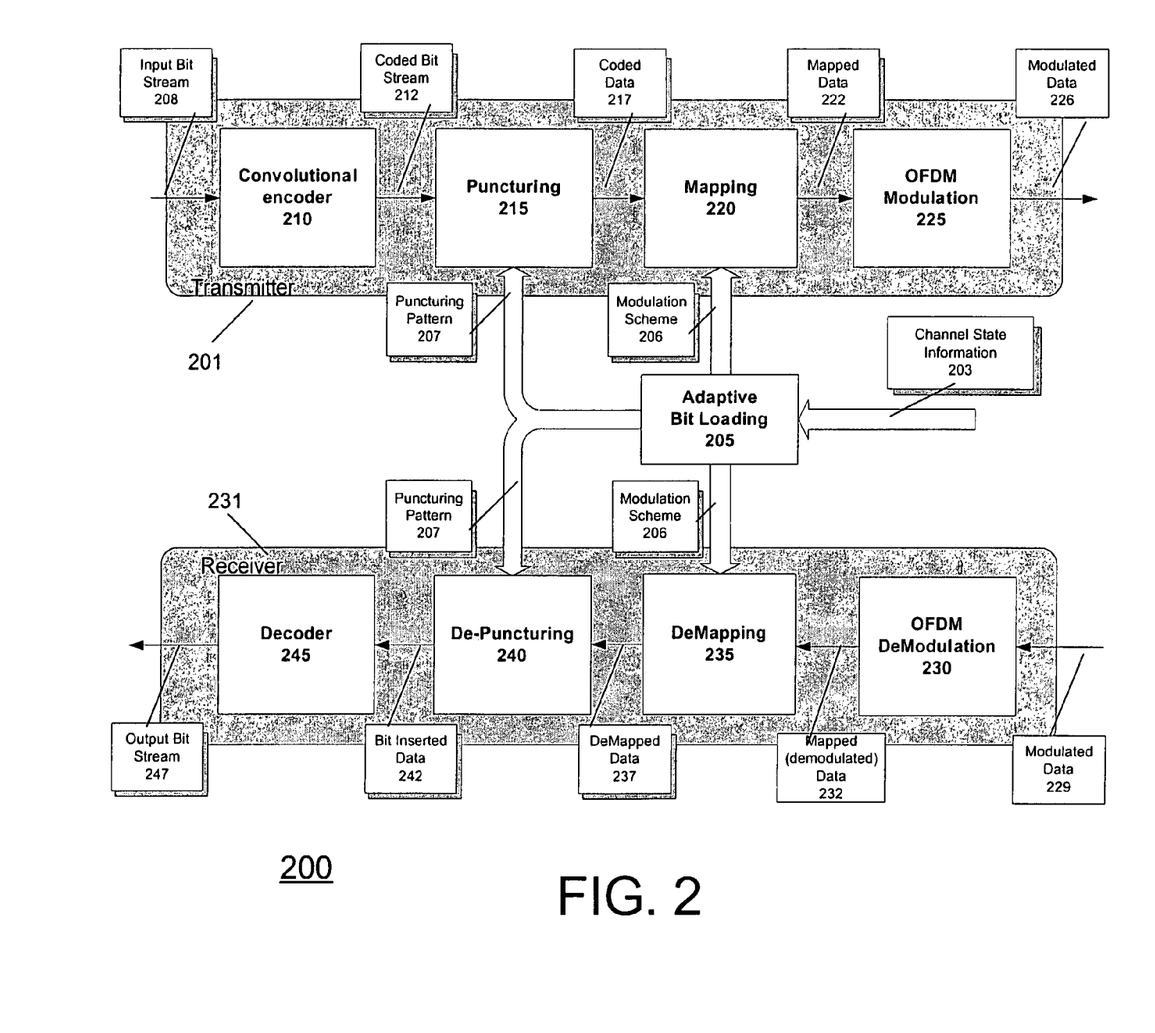
FIG. 2 is a block diagram of a wireless transceiver according to an example embodiment.

FIG. 2 is a block diagram of a wireless transceiver according to an example embodiment. Referring to FIG. 2, transceiver 200 may include a transmitter 201 to transmit information and a receiver 231 to receive information. Transceiver 200 may include an adaptive bit loading block 205 that may receive channel state information 203. Channel state information 203 may include a signal-to-noise ratio (SNR), a bit error rate (BER), a packet error rate, a channel estimate or channel transfer function, etc., or other information that may describe a channel transmission condition.

Adaptive bit loading block 205 may adaptively select a modulation scheme 206 and a puncturing pattern 207 to be used by at least transmitter 201 based upon the channel state information 203. According to an example embodiment, puncturing block 215 may discard some of the coded bits in accordance with the puncturing pattern 207. Therefore, puncturing may increase the code rate since according to an example embodiment, a code rate may be considered to be a ratio of data bits/code bits.

Instead of selecting a puncturing pattern, adaptive bit loading block 205 may alternatively first select a desired code rate based on the channel state information, and then select a puncturing pattern to achieve the selected code rate given the mother code-rate provided by coder 210. In this example embodiment, adaptive bit loading block 205 may also select a modulation scheme based on the channel state information.

According to an example embodiment, channel state information 203 may be provided for each of a plurality of OFDM subcarriers. Adaptive bit loading block 205 may select a modulation scheme 206 and a code rate and/or puncturing pattern 207 for each OFDM subcarrier based upon the channel state information of the corresponding subcarrier.

According to an example embodiment, the modulation scheme 206 and the puncturing pattern 207 may be varied for each OFDM subcarrier (on a per subcarrier basis). In another embodiment, the OFDM subcarriers may be split into blocks of two or more adjacent subcarriers, referred to as subbands. The same modulation scheme and same puncturing pattern (or desired code rate) may be selected-for each subband (e.g., same modulation scheme and same puncturing pattern for all subcarriers of a subband), although the invention is not limited thereto.

In selecting a modulation scheme and puncturing pattern for a subband, channel state information for one or more subcarriers in the subband may be used to select these parameters for the subband. For example, the lowest SNR may be used (e.g., the lowest SNR for the subcarriers in the subband), the average SNR for all subcarriers in the subband may be used, or other technique. These are some examples, and the invention is not limited thereto.

A variety of different modulation schemes may be used. For example the following modulation schemes may be used: binary phase-shift keying (BPSK), quadrature phase shift keying (QPSK), Quadrature Amplitude Modulation (QAM) such as 16-QAM (16 different symbols), 64-QAM (64 different symbols), 256 QAM, etc., although the invention is not limited thereto. Other modulation schemes may be used.

Coding may involve coding data bits using a coding technique (such as convolutional coding, etc.) to produce coded bits or code bits. Puncturing may include, for example, dropping or discarding or not transmitting certain coded bits to increase the code rate. Puncturing may be used, for example, where an existing encoder uses a particular code rate, and it may be desirable to increase the code rate by dropping or not transmitting one or more code bits. At the receiving node, the receiver or demodulator may insert one or more dummy bits in place of the omitted (punctured) bits, and then decode the message.

According to an example embodiment, higher modulation schemes and higher code rates (e.g., through more puncturing) may correspond to higher SNRs (or better channel transmission conditions generally). According to an example embodiment, if the channel state information, such as SNR for a subcarrier corresponds to a first SNR range, a first modulation scheme and a first puncturing pattern may be selected for that subcarrier or subband for the transmission of data. If the SNR corresponds to a second SNR range, then a second modulation type and a second puncturing pattern may be selected for transmission of data. These are just some examples and the invention is not limited thereto.

The selected modulation scheme 206 and puncturing pattern 207 may also be provided to receiver 231 to select these parameters for demapping and de-puncturing of received information, although these parameters may alternatively be selected by a remote transmitter for a receiver 231.

Transmitter 201 will now be described. An input bit stream 208 is input at an encoder 210, which may be a convolutional encoder for example, although the invention is not limited thereto. Other types of coding may be used. Encoder 210 may, for example, convolutionally encode the input bit stream 208 using a mother code rate of ½, although the invention is not limited thereto. Other mother code rates may be used. Encoder 210 may output a coded bit stream 212.

The coded bit stream 212 may be input to a puncturing block 215. Puncturing block 215 may puncture the coded bit stream by dropping or discarding one or more coded bits according to a puncturing pattern 207 specified by adaptive bit loading block 205 to produce a coded and punctured data stream 217. Due to such puncturing, the (punctured) code rate for the punctured data stream 217 may be higher than the mother code rate of the bit stream 212 output from encoder 210. Thus, each OFDM subcarrier or subcarriers in each subband may be coded with a selected code rate (based on the puncturing pattern that is selected on a per subcarrier or per subband basis).

Mapping block 220 may then extract a number of bits from bit stream 217 and maps the bits to a corresponding symbol of a selected modulation scheme. In an example embodiment, mapping block may extract or select a number-of bits in punctured bit stream 217 and maps the bits to a corresponding subcarrier symbol of the selected modulation scheme for each (or at least some) of the subcarriers of the OFDM symbol. This mapping may be repeated for a plurality of OFDM symbols. Modulation block 225 may then perform OFDM modulation to generate modulated data output 226 for transmission.

Receiver 231 in FIG. 2 will now be described. Modulated data 229 is received and OFDM demodulated by demodulation block 230 to output mapped (demodulated) data 232. Demapping block 235 demaps OFDM subcarrier symbols to demapped data bits 237. According to an example embodiment, depuncturing block 240 depunctures the demapped data by inserting dummy bits at the appropriate locations based on the puncturing pattern 207 to output bit inserted (depunctured) data 242. This recovers the mother code. Decoder 245 may then decode the depunctured data 242 to generate an output bit stream 247. According to an example embodiment, if a convolutional encoder is used to encode the data at the transmit end, a Viterbi decoder may be used for example as the decoder 245, although the invention is not limited thereto.

Figure 3:
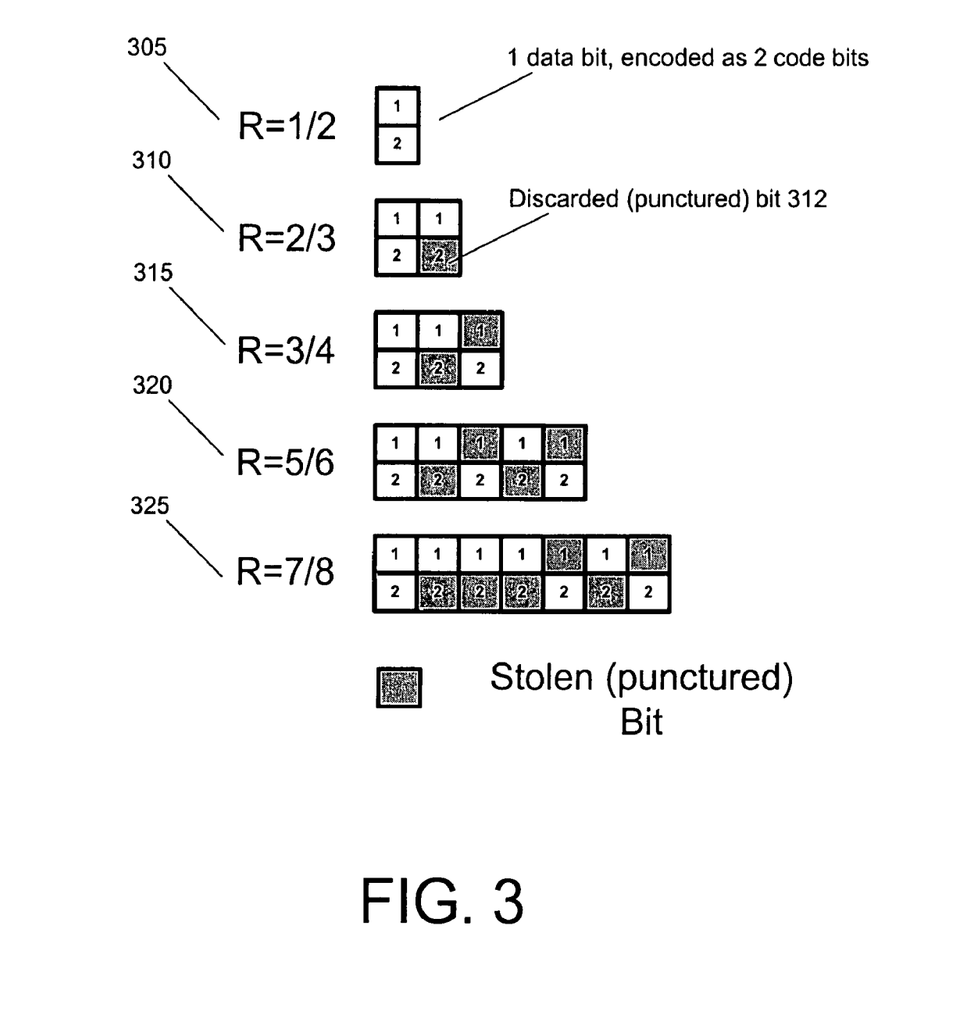
FIG. 3 is a diagram illustrating a number of puncturing patterns according to an example embodiment.

FIG. 3 is a diagram illustrating a number of puncturing patterns according to an example embodiment, although the invention is not limited to this format or type of puncturing patterns. In this example, convolutional codes with a rate of (n−1)/n may be formed from puncturing a mother code having a code rate=½ convolutional code, although the invention is not limited thereto. Other codes or code rates may be used. In an example embodiment, the mother code may be generated with a code constraint length of 7,and using generator polynomials of $G_1=133_8$ and $G_2=171_8$, as examples. However, the invention is not limited thereto.

Several example puncturing patterns are shown in FIG. 3. As shown in FIG. 3, at 305, the mother code is shown, with one data bit being coded as two code bits, producing a mother code rate=½. No puncturing is performed for pattern 305.

At 310, two data bits are encoded as four code bits (mother code rate=½). The four bits may be referred to as input coded bits for the puncturing pattern. The puncturing pattern 310 shows that one of the four input coded bits is discarded, resulting in a code rate of ⅔ (two data bits being encoded as three code bits). The grayed out bit 312 in the puncturing pattern 310 is discarded (punctured). The three white (non-discarded) bits may be referred, to as the output coded bits of the puncturing pattern.

At 315, three data bits are encoded as six code bits (mother code rate=½). A code rate of ¾ is achieved by discarding two of the six code bits (three data bits encoded as four code bits), as shown by the puncturing pattern 315. Therefore, there are four output coded bits in this puncturing pattern in 315.

At 320, five data bits are encoded as 10 code bits (mother code rate=½). Four of the 10 input coded bits are discarded as shown by the puncturing pattern 320, resulting in a code rate of ⅚ (five data bits encoded as 6 code bits). There are six output coded bits for this puncturing pattern.

At 325, seven data bits are encoded as 14 code bits or input coded bits (mother code rate=½). Six of the 14 input coded bits are discarded as shown by the puncturing pattern 320, resulting in a code rate of ⅞ (seven data bits encoded as eight code bits). Therefore, there are eight output coded bits for this puncturing pattern.

Table 1 below illustrates some parameters that may be used for an adaptive puncturing scheme according to an example embodiment. A number of parameters are shown in the columns of Table 1,including the modulation type, number of bits per OFDM subcarrier (modulation) symbol, resulting code rate. (after puncturing), the number of data bits per subcarrier symbol (after puncturing) for both single carrier bit loading and subband bit loading (2 subcarriers per subband in this example), and the data rate in Mbits/s for an example 20 MHZ channel having 48 OFDM subcarriers, although the invention is not limited thereto. Other data rates, channel sizes, and other parameters may be used.

TABLE 1

Example 20 MHz channel adaptive puncturing scheme parameters

Modulation and Coding parameters

| Modulation Type | Number Of Bits per Modulation symbol | Code Rate (R) | Puncturing Output Length (number of output coded bits in puncturing pattern) | Single carrier BL Number of data bits per modulation symbol | Two Subcarriers Subband BL Number of data bits per modulation symbol | Data Rate Mbits/s 20 Mhz 48 Data subcarriers (802.11a timing-related parameters) |
|---|---|---|---|---|---|---|
| BPSK | 1 | 1/2 | 2 | — | 0.5 | 6 |
| QPSK | 2 | 1/2 | 2 | 1 | 1 | 12 |
| QPSK | 2 | 3/4 | 4 | — | 1.5 | 18 |
| 16 QAM | 4 | 1/2 | 2 | 2 | 2 | 24 |
| 16 QAM | 4 | 3/4 | 4 | 3 | 3 | 36 |
| 16 QAM | 4 | 7/8 | 8 | — | 3.5 | 42 |
| 64 QAM | 6 | 2/3 | 3 | 4 | 4 | 48 |
| 64 QAM | 6 | 3/4 | 4 | — | 4.5 | 54 |
| 64 QAM | 6 | 5/6 | 6 | 5 | 5 | 60 |
| 256 QAM | 8 | 3/4 | 4 | 6 | 6 | 72 |
| 256 QAM | 8 | 7/8 | 8 | 7 | 7 | 84 |

According to an example embodiment, it may be desirable in some cases to have the number of modulation bits in a single OFDM subcarrier symbol (if adaptive bit loading per subcarrier is performed) or in the subcarrier symbols of a single subcarrier subband (if adaptive bit loading per subband is performed) to be the same or a multiple (e.g., 2×, 3×, . . . ) of the number of output coded bits in a puncturing pattern that is used. For example, a puncturing processing may be performed on a set of input coded bits (see, e.g., FIG. 3). For example, as shown in FIG. 3, a code rate R=¾ puncturing pattern may need 6 input coded bits from the mother code (R=½). Puncturing block 215 discards 2 bits from this set of input coded bits, e.g., in positions as indicated by the puncturing pattern. In this example, the number of output coded bits in the puncturing pattern is equal to 4 (this is a number of "white squares" in puncturing pattern, shown in FIG. 3).

In an example embodiment, it may be desirable to map a set of output coded bits from the puncturing pattern (or a multiple of the output coded bits of the puncturing pattern) to a subcarrier symbol in one OFDM subcarrier (e.g., if adaptive bit-loading is used for individual subcarriers) or to the subcarrier symbols in one subband (e.g., if adaptive bit loading is used for subcarrier subbands), because an adjacent OFDM subcarrier or subband of subcarriers may have another code rate (e.g., use a different puncturing pattern). Therefore, in one example embodiment, to allow the output coded bits from a puncturing pattern to be mapped or modulated onto a single subcarrier or a single subband, it may be advantageous for the number of bits in one OFDM subcarrier symbol (e.g., if adaptive bit loading per subcarrier is performed) or the number of bits in subcarrier symbols in one subband (e.g., if adaptive bit loading per subband is performed) to be the same or a multiple (e.g., 2×, 3×, . . . ) of the number of output coded bits of the puncturing pattern that is used.

As an additional example, referring to Table 1, a 16 QAM modulation scheme uses four bits per subcarrier symbol. If a code rate (after puncturing) ¾ is used, this results in four output coded bits in the puncturing pattern, which is the same as the number of bits (4) per subcarrier symbol for 16 QAM. This also transmits an integer number of data bits per OFDM subcarrier symbol. In this example, there will be 4 code bits per subcarrier symbol, and 3 data bits per subcarrier symbol (due to ¾ code rate and 16 QAM modulation for this subcarrier).

Likewise, if 16 QAM modulation scheme is used, but with a code rate=⅞, this results in 8 output coded bits in the puncturing pattern. The 16 QAM modulation uses 4 bits per subcarrier symbol. Therefore, a subband of two 16 QAM subcarriers (8 bits total across two subcarrier symbols in the subband) can accommodate (is the same number of bits as) the 8 output coded bits from the puncturing pattern. Thus, a two subcarrier subband works well for this 16 QAM, R=⅞ example. These are just examples and the invention is not limited thereto.

Note that for adaptive bit loading for single subcarrier, adaptive puncturing allows use of data bits per subcarrier symbol in the range 1 to 7, but does not (according to this example embodiment) allow use of the most robust BPSK modulation, as shown in Table 1, although the invention is not limited thereto. In this example, using 2 subcarrier subband adaptive bit loading allows use of data bits per subcarrier in the range 0.5 to 7 (also in finer granularity, e.g., steps of 0.5 data bits) as well as use of BPSK, as shown in Table 1. Therefore, in some cases, subcarrier subband adaptive bit loading may have advantages over single subcarrier adaptive bit loading. These are just some examples and the invention is not limited thereto.

It may also be advantageous to select a modulation scheme and a puncturing pattern (or code rate) where an integer number of data bits will be mapped onto a single subcarrier symbol (for single subcarrier adaptive bit loading). Examples where this occurs in Table 1 include a QPSK modulation scheme with a code rate of ½, resulting in 1 data bit per subcarrier symbol, and 16QAM with a code rate of ¾, resulting in 3 data bits per subcarrier-symbol. Note, in table 1, a dash in the column entitled "number of data bits per [subcarrier] modulation symbol" indicates where an integer number of data bits does not map to a subcarrier symbol for those parameters.

Note that each of the combinations of modulation types and code rates shown in Table 1 may allow an integer number of data bits to be encoded on a 2 subcarrier subband. For example, 16QAM modulation with a code rate=⅞ provides 3.5 data bits per subcarrier symbol, and therefore 7 data bits per subband (two subcarriers per subband). These are just additional examples and the invention is not limited thereto.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus comprising:
an adaptive bit loading block to receive channel state information for a plurality of subcarriers and to select a modulation scheme and a puncturing pattern for each of the plurality of subcarriers or for each of a plurality of subbands based on the channel state information, the adaptive bit loading block to select a first puncturing pattern having a first number of output coded bits for a first subcarrier or subband of the plurality of subcarriers or subbands, the adaptive bit loading block to select a second puncturing pattern having a second number of output coded bits for a second subcarrier or subband of the plurality of subcarriers or subbands, the first number of output coded bits is different than the second number of output coded bits;
a puncturing block to puncture a coded bit stream for each of the plurality of subcarriers or subbands in accordance with the selected puncturing pattern;
a mapping block to map a coded and punctured bit stream output from the puncturing block to one or more subcarrier symbols for each of the plurality of subcarriers or subbands, the first subcarrier or subband and the second subcarrier or subband are mapped to a set of the one or more subcarrier symbols.

2. The apparatus of claim 1 and further comprising an encoder coupled to the puncturing block to produce the encoded bit stream.

3. The apparatus of claim 2 wherein the encoder comprises a convolutional encoder.

4. The apparatus of claim 1 wherein each of the subbands comprises a plurality of subcarriers.

5. The apparatus of claim 1 wherein the mapping block comprises a mapping block to map a coded and punctured bit stream output from the puncturing block to one or more OFDM subcarrier symbols for each of a plurality of OFDM subcarriers or OFDM subcarrier subbands, where the OFDM subcarrier subbands comprises a plurality of OFDM subcarriers.

6. The apparatus of claim 1 and further comprising an OFDM modulator to modulate a selected subcarrier symbol onto a OFDM subcarrier for each of a plurality of OFDM subcarriers.

7. The apparatus of claim 1 wherein the puncturing pattern and modulation scheme for a subcarrier are selected such that the number of bits in the subcarrier symbol or subband are the same or a multiple of a number of output coded bits in a puncturing pattern.

8. The apparatus of claim 1 wherein the puncturing pattern and modulation scheme are selected such that one or more sets of output coded bits in a puncturing pattern may map onto one subcarrier or one subband.

9. The apparatus of claim 1 wherein the puncturing pattern and modulation scheme are selected such that one or more sets of output coded bits in the puncturing pattern may map onto one subcarrier if adaptive bit loading per subcarrier is performed, or map onto one subband if adaptive bit loading per subband is performed.

10. An apparatus comprising an adaptive bit loading block to select a modulation scheme and a puncturing pattern for an OFDM subcarrier or an OFDM subcarrier subband based on subcarrier channel state information such that a first number of output coded bits in the puncturing pattern for the OFDM subcarrier or OFDM subcarrier subband is different than a second number of output coded bits in a second puncturing pattern for a second OFDM subcarrier or OFDM subcarrier subband, the OFDM subcarrier or OFDM subcarrier subband and the second OFDM subcarrier or OFDM subcarrier subband are mapped to a set of one or more subcarrier symbols.

11. The apparatus of claim 10 wherein the modulation scheme and the puncturing pattern are selected such that a number of bits in an OFDM subcarrier symbol or in an OFDM subcarrier subband to be the same or a multiple of the number of output coded bits in the puncturing pattern.

12. An apparatus comprising an adaptive bit loading block to select a modulation scheme and a puncturing pattern for each of a plurality of OFDM subcarriers or OFDM subcarrier subbands based on subcarrier channel state information, at least one of said subcarrier subbands comprising a plurality of OFDM subcarriers, the adaptive bit loading block to select a first puncturing pattern having a first number of output coded bits for a first OFDM subcarrier or OFDM subcarrier subband of the plurality of OFDM subcarriers or subbands, the adaptive bit loading block to select a second puncturing pattern having a second number of output coded bits for a second OFDM subcarrier or OFDM subcarrier subband of the plurality of OFDM subcarriers or subbands, the first number of output coded bits is different than the second number of output coded bits, the first OFDM subcarrier or OFDM subcarrier subband and the second OFDM subcarrier or OFDM subcarrier subband are mapped to a set of OFDM subcarrier symbols.

13. The apparatus of claim 12 and further comprising a puncturing block to puncture a coded bit stream for each of the plurality of the subcarrier subbands according to the puncturing pattern selected for the subcarrier subband.

14. The apparatus of claim 13 and further comprising a mapping block to map coded and punctured bits into the OFDM subcarrier symbols according to the selected modulation scheme for each of the subcarrier subbands.

15. A method comprising:
receiving channel state information for each of a plurality of subcarriers;
selecting a modulation scheme and a puncturing pattern for each of a plurality of subcarriers or subcarrier subbands based on the subcarrier channel state information;
selecting a first puncturing pattern having a first number of output coded bits for a first subcarrier or subband of the plurality of subcarriers or subbands;
selecting a second puncturing pattern having a second number of output coded bits for a second subcarrier or subband of the plurality of subcarriers or subbands, the first number of output coded bits is different than the second number of output coded bits; and
mapping the first subcarrier or subband and the second subcarrier or subband to subcarrier symbols.

16. The method of claim 15 and further comprising:
coding data bits to produce a coded bit stream;
puncturing the coded bit stream for each of a plurality of subcarriers according to the selected puncturing pattern for each subcarrier; and mapping bits from the coded and punctured bit stream to the subcarrier symbols according to the selected modulation schemes for each subcarrier or subband.

17. The method of claim 15 wherein the selecting comprises selecting the modulation scheme and the puncturing pattern for each of the plurality of subcarriers or subcarrier subbands such that a number of bits in an OFDM subcarrier symbol or OFDM subcarrier subband is the same or a multiple of the number of output coded bits in the puncturing pattern.

18. A method comprising:
receiving channel state information for each of a plurality of subcarriers;
selecting a modulation scheme and a puncturing pattern for each of a plurality of subcarrier subbands based on the subcarrier channel state information, each subband comprising a plurality of OFDM subcarriers;
selecting a first puncturing pattern having a first number of output coded bits for a first subband of the plurality of subbands;
selecting a second puncturing pattern having a second number of output coded bits for a second subband of the plurality of subbands, the first number of output coded bits is different than the second number of output coded bits; and
mapping the first subband and the second subband to a set of subcarrier symbols.

* * * * *